United States Patent

Choi

(12) United States Patent
(10) Patent No.: US 6,918,159 B2
(45) Date of Patent: Jul. 19, 2005

(54) HINGE APPARATUS

(75) Inventor: Kang-ho Choi, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/223,476

(22) Filed: Aug. 20, 2002

(65) Prior Publication Data

US 2003/0046791 A1 Mar. 13, 2003

(30) Foreign Application Priority Data

Sep. 11, 2001 (KR) .......................................... 2001-55731

(51) Int. Cl.[7] .............................................. E05D 11/10
(52) U.S. Cl. .............................. 16/347; 16/293; 16/297; 16/321; 16/337
(58) Field of Search .......................... 16/293, 297, 304, 16/321, 337, 343–344, 347

(56) References Cited

U.S. PATENT DOCUMENTS

| | | | | |
|---|---|---|---|---|
| 4,620,344 A | * | 11/1986 | Lewis, Jr. ..................... | 16/337 |
| 5,022,778 A | * | 6/1991 | Lu ............................... | 16/273 |
| 5,028,913 A | | 7/1991 | Kitamura | |
| 5,075,929 A | * | 12/1991 | Chung ........................ | 16/342 |
| 5,109,570 A | * | 5/1992 | Okada et al. ................. | 16/289 |
| 5,231,734 A | * | 8/1993 | Rude ........................... | 16/342 |
| 5,771,539 A | * | 6/1998 | Wahlstedt et al. ............ | 16/342 |
| 5,894,633 A | * | 4/1999 | Kaneko ....................... | 16/306 |
| 5,940,936 A | * | 8/1999 | Lu ............................... | 16/337 |
| 5,970,580 A | * | 10/1999 | Katoh .......................... | 16/337 |
| 6,125,507 A | * | 10/2000 | Katoh .......................... | 16/329 |
| 6,481,057 B2 | * | 11/2002 | Lin .............................. | 16/340 |
| 6,539,582 B1 | * | 4/2003 | Chae ........................... | 16/340 |
| 6,568,034 B2 | * | 5/2003 | Cho ............................. | 16/337 |

FOREIGN PATENT DOCUMENTS

| | | | | |
|---|---|---|---|---|
| JP | 06017570 A | * | 1/1994 | .......... E05D/11/10 |
| WO | 95/33392 | | 12/1995 | |

* cited by examiner

Primary Examiner—Daniel P. Stodola
Assistant Examiner—Christopher Boswell
(74) Attorney, Agent, or Firm—Staas & Halsey LLP (57) ABSTRACT

A hinge apparatus disposes a panel to be opened and closed with respect to a body of an appliance. The hinge apparatus includes a fixing bracket fixed on the body, a supporting bracket fixed on the panel and a hinge shaft fixed on the fixing bracket to rotatably support the supporting bracket. The hinge apparatus also includes an automatic pivot unit to cause the panel to be opened with respect to the body by a predetermined free rotation angle when a locking state between the panel and the body is released. Further, the hinge apparatus includes a manual pivot unit to provide a frictional force between the supporting bracket and the hinge shaft. The frictional force restricts the supporting bracket from being automatically rotated by the automatic pivot unit and also fixes the panel, which is opened further from the predetermined free rotation angle, in a fixed position. The hinge apparatus includes a fixing pin connected to one end of the hinge shaft to restrict the hinge shaft, the supporting bracket, the automatic pivot unit and the manual pivot unit from being separated from each other.

15 Claims, 6 Drawing Sheets

HINGE APPARATUS

CROSS REFERENCE TO RELATED APPLICATIONS

This application claims the benefit of Korean Application No. 2001-55731, filed Sep. 11, 2001 in the Korean Industrial Property Office, the disclosure of which is incorporated herein by reference.

BACKGROUND OF THE INVENTION

1. Field of the Invention

The present invention relates to a hinge apparatus, and more particularly, to a hinge apparatus having a combined function of an automatic pop-up and forced hinging.

2. Description of the Prior Art

Recently, there has been a great improvement in and marketing of folder type home electronic appliances like camcorders or laptop computers in which an LCD panel is opened and closed with respect to an appliance body. To open and close the LCD panel with respect to the body, a hinge apparatus is required.

Figure 1:
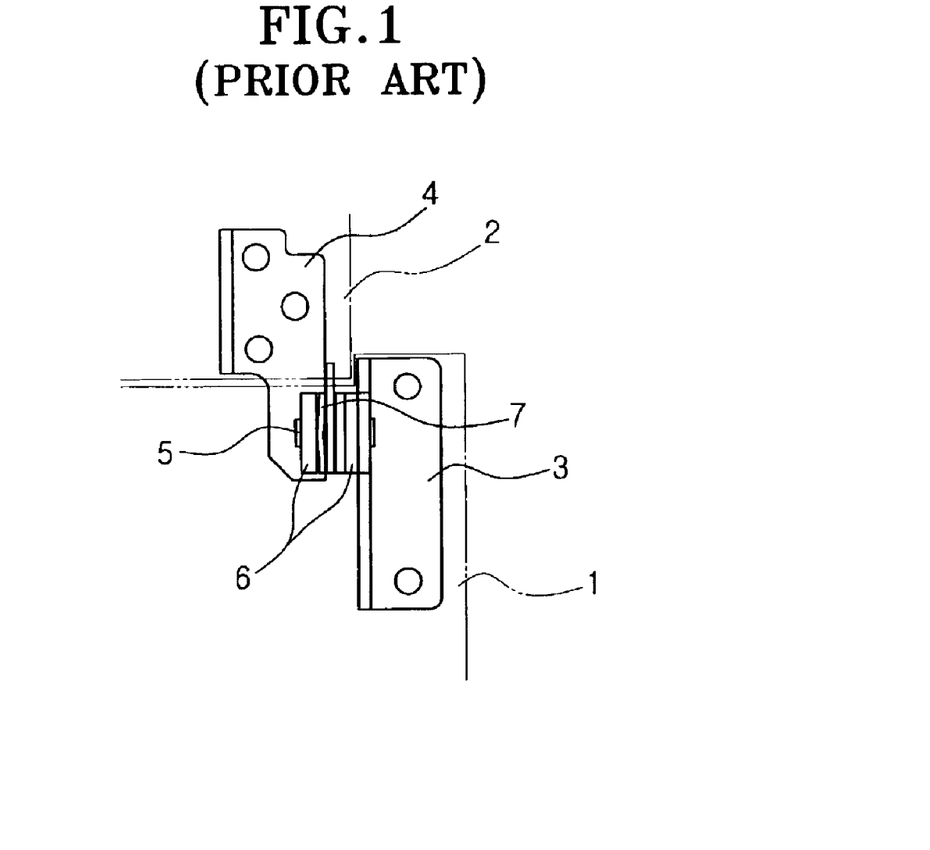
FIG. 1 is a schematic view showing a conventional hinge apparatus.

FIG. 1 shows an example of a conventional hinge apparatus employed in a laptop computer. As shown in FIG. 1, the hinge apparatus includes a fixing bracket 3 disposed on a body 1, a supporting bracket 4 fixed on a panel 2 that is opened and closed with respect to the body 1, a hinge shaft 5 connected to the fixing bracket 3 and the supporting bracket 4, a plurality of washers 6 disposed on the hinge shaft 5, and a plate spring 7.

In the above-described configuration, the supporting bracket 4 is connected between the washers 6, while the plate spring 7 is connected between the supporting shaft 4 and the washers 6. Accordingly, due to an elastic force of the plate spring 7, a frictional force is generated between the supporting shaft 4 and the washers 6. Due to the frictional force, the panel 2 is prevented from free-pivoting with respect to the body 1 when the panel 2 opens or closes the body 1. When the panel 2 is opened with respect to the body 1 by a predetermined angle, the panel 2 is fixed in its position by the frictional force. More specifically, a user may adjust the angle of the panel 2 with respect to the body 1 manually by releasing a locking device disposed between the panel 2 and the body 1, and moving the panel 2 up or down.

The above-described configuration is one of typical examples of the hinge apparatus, which needs an improvement in terms of handling. That is, even when the locking device is released, the panel 2 remains tightly contacted with the body 1 and it is hard for the user to open the panel 2 manually.

SUMMARY OF THE INVENTION

Accordingly, it is an object of the present invention to provide a hinge apparatus of an improved structure that has an automatic pivoting section and a manual pivoting section for a releasing operation of a locking device.

Additional objects and advantages of the invention will be set forth in part in the description which follows and, in part, will be obvious from the description, or may be learned by practice of the invention.

The foregoing and other objects of the present invention are achieved by providing a hinge apparatus to dispose a panel to be opened and closed with respect to a body of an appliance. The hinge apparatus includes a fixing bracket fixed on the body, a supporting bracket fixed on the panel, and a hinge shaft fixed on the fixing bracket to rotatably support the supporting bracket. The hinge apparatus also includes an automatic pivot unit to cause the panel to be opened with respect to the body by a predetermined free rotation angle when a locking state between the panel and the body is released. The hinge apparatus further includes a manual pivot unit to provide a frictional force between the supporting bracket and the hinge shaft. The frictional force is configured to restrict the supporting bracket from being automatically rotated by the automatic pivot unit and is also configured to fix the panel, which is opened further from the predetermined free rotation angle, in a fixed position. The hinge apparatus includes a fixing pin connected to one end of the hinge shaft to restrict the hinge shaft, the supporting bracket, the automatic pivot unit and the manual pivot unit from being separated from each other.

According to an aspect of the invention, the automatic pivot unit includes a coil spring having one end fixed on the fixing bracket, and the other end movably supported on the supporting bracket to provide the supporting bracket with a torsion in a direction that opens the panel with respect to the body. The automatic pivot unit also includes a portion defining a guide hole formed at a predetermined length in the supporting bracket to guide the other end of the coil spring. The one end of the coil spring restricts the other end of the coil spring from moving when the panel is in a closed state, and guides a movement of the other end of the coil spring after the panel is opened by the predetermined free rotation angle.

According to an aspect of the invention, the manual pivot unit includes a plate spring fixed on and pivoted together with the supporting bracket, and a projection protruding from one side thereof. The manual pivot unit also includes a frictional plate fixed on the hinge shaft in tight contact with the plate spring. The frictional plate is formed at a predetermined length corresponding to the predetermined free rotation angle of the panel to guide a movement of the projection so that the projection is guided along a guide hole when the panel is automatically rotated. The projection escapes from the guide hole to contact with one side of the frictional plate to generate a frictional force when the panel is moved out of the predetermined free rotation angle.

According to an aspect of the invention, the projection is provided in pairs that are formed at different distances from a center of rotation of the plate spring, and the guide hole is provided in pairs that are formed with respect to a center of the frictional plate asymmetrically to correspond to the pair of projections.

According to another aspect of the invention, a pivot angle restricting device is provided to restrict an angle of a manual rotation of the supporting bracket. The pivot angle restricting device includes a locking portion protruding from an outline of the frictional plate, and a locking projection bent from one end of the supporting bracket to be locked with the locking portion during the rotation of the supporting bracket.

According to an aspect of the invention, the hinge shaft includes a body of a circular section formed in a middle of the hinge apparatus to support the coil spring, and a fixing portion extended from both ends of the body, having a non-circular section to correspond to a coupling hole of a non-circular section formed on the fixing bracket and the frictional plate. The hinge shaft also includes a supporting portion extended between the fixing portion and the body to support one side of the supporting bracket in close contact therewith.

BRIEF DESCRIPTION OF THE DRAWINGS

The above and other objects and advantages of the invention will become apparent and more appreciated from the following description of the preferred embodiments, taken in conjunction with the accompanying drawings of which.

DETAILED DESCRIPTION OF PREFERRED EMBODIMENTS

Reference will now be made in detail to the present preferred embodiments of the present invention, examples of which are illustrated in the accompanying drawings, wherein like reference numerals refer to like elements throughout.

Figure 2:
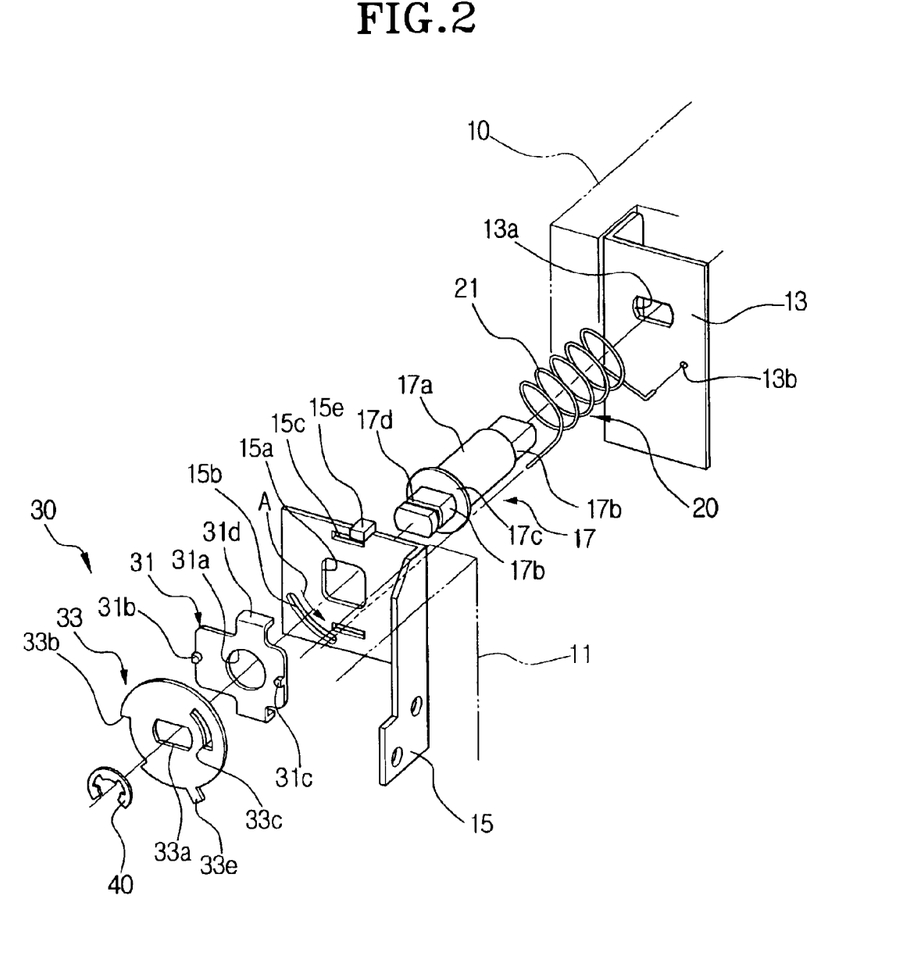
FIG. 2 is a schematic perspective view of a hinge apparatus, according to an embodiment of the present invention.
Figure 3:
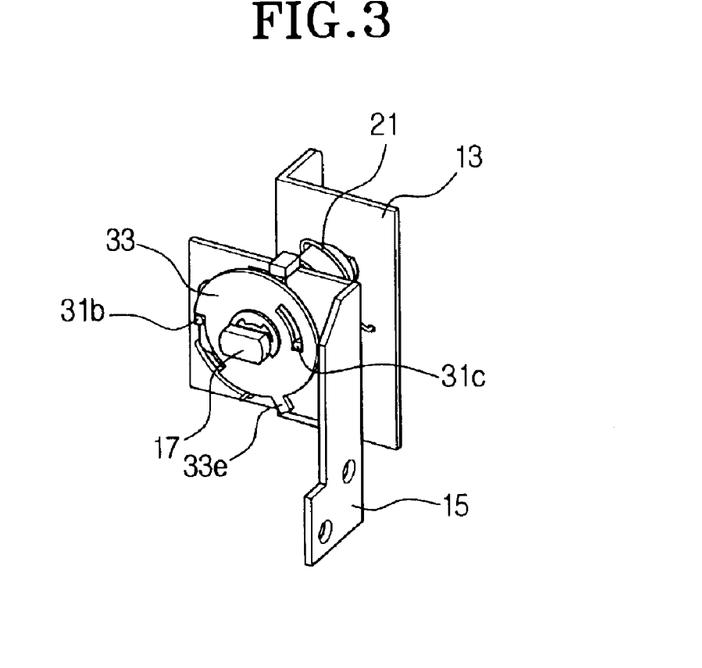
FIG. 3 is a perspective view showing the hinge apparatus of FIG. 2 connected.

As shown in FIG. 2, a hinge apparatus according to the present invention is employed to connect a panel 11 to a body 10 of an appliance so that the panel 11 is opened and closed with respect to the body 10. The hinge apparatus includes a fixing bracket 13 fixed onto the body 10, a supporting bracket 15 fixed on the panel 11, a hinge shaft 17, an automatic pivot unit 20, a manual pivot unit 30, and a fixing pin 40.

Herein, a laptop computer will be taken as an example for the appliance, and accordingly, the body 10 is the laptop computer body, and the panel 11 is an LCD panel of the laptop computer. A general locking device is disposed between the body 10 and the panel 11. Accordingly, when a user desires to open the panel 11 with respect to the body 10, he/she may open it after releasing the locking device.

The fixing bracket 13 is fixed onto the body 10 by a screw (not shown). The fixing bracket 13 has a fixing hole 13a to which the hinge shaft 17 is connected, and a supporting hole 13b to which one end of a coil spring 21, which will be described later, is fixed. The shape of the fixing hole 13a is non-circular.

The supporting bracket 15 is fixed onto the panel 11 by a screw (not shown). The supporting bracket 15 faces the fixing bracket 13 at a predetermined distance therefrom. Also, the supporting bracket 15 has a shaft passing hole 15a through which the hinge shaft 17 is passed, and a guide hole 15b to which the other end of the coil spring 21 is connected. The shaft passing hole 15a may either be in a circular shape, or in a non-circular shape that is larger than an outer circumference of the hinge shaft 17. With the hinge shaft 17 being connected to the shaft passing hole 15a, the supporting bracket 15 is rotated relative to the hinge shaft 17.

The hinge shaft 17 includes a body 17a of a circular section formed in the middle thereof, fixing portions 17b of a non-circular section extended from both ends of the body 17a, and a supporting portion 17c extended between the fixing portion 17b and the body 17a. The body 17a is connected with the coil spring 21. The fixing portion 17b is connected to fixing hole 13a and shaft passing hole 15a. One end of the fixing portion 17b has a connecting hole 17d to which the fixing pin 40 is connected. The other end of the fixing portion 17b is connected to the fixing hole 13a of the fixing bracket 13 and then completely fixed by being caulked by a caulking device. Alternatively, the other end of the fixing portion 17b may also be fastened by the fixing pin 40.

The automatic pivot unit 20 is employed for the panel 11 to automatically open with respect to the body 10 by a predetermined angle when the locking of the panel 11 and the body 10 is released. The automatic pivot unit 20 includes the coil spring 21 disposed on the hinge shaft 17 to elastically bias the panel 11 in an open direction with respect to the body 10. The guide hole 15b formed in the supporting bracket 15 is also part of the automatic pivot unit 20.

Figure 4A:
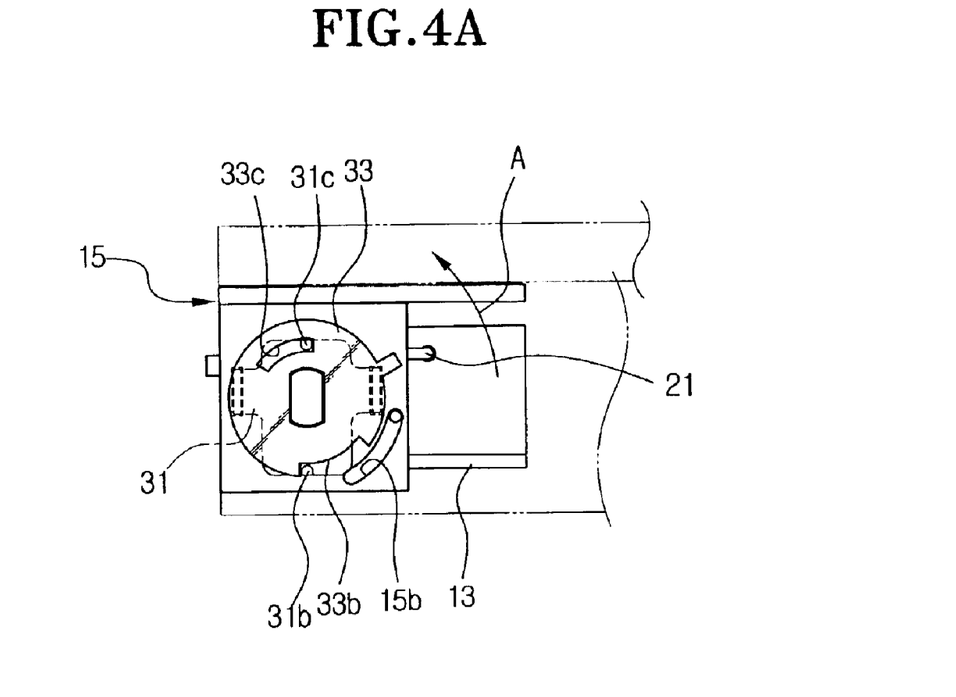
FIGS. 4A and 4B is a side view and a front view, respectively, showing the hinge apparatus of the present invention in a state in which a panel is closed with respect to an appliance body.

As described above, one end of the coil spring 21 is connected to the supporting hole 13b of the fixing bracket 13, while the other end is connected to the guide hole 15b of the supporting bracket 15. Thus, when the panel 11 is covering the body 10, the coil spring 21 is in a compressed state with the other end connected to the guide hole 15b and fixed to one side of the guide hole 15b. Accordingly, the supporting bracket 15 is pressed in a direction as indicated by an arrow A as shown in FIG. 4A. The direction as shown, indicates the opening of the panel 11 with respect to the body 10. When the locking of the panel 11 and the body 10 is released, the supporting bracket 15 is automatically pivoted by a predetermined angle in the arrow A direction by a torsion of the coil spring 21. When the coil spring 21 is fully decompressed and the torsion becomes zero (0), the other end of the coil spring 21 is guided along the guide hole 15b instead of being compressed or decompressed by the supporting bracket 15 in the event that the supporting bracket 15 is further pivoted in the A direction. The torsion of the coil spring 21 is set at an appropriate level so that the panel 11 is automatically opened with respect to the body 10 by an angle of approximately 45°. The guide hole 15b is formed to have an appropriate length to correspond to the automatic opening angle of the panel 11.

The manual pivot unit 30 restricts the angle of automatic rotation of the supporting bracket 15 by the automatic pivot unit 20. The manual pivot unit 30 also provides a frictional force between the supporting bracket 15 and the hinge shaft 17 to fix the supporting bracket 15 in a fixed position. The supporting bracket 15 is further opened by an external force from the automatic opening angle. The manual pivot unit 30 has a plate spring 31 fixed on the supporting bracket 15, and a frictional plate 33 fixed on the hinge shaft 17 in tight contact with the plate spring 31. The plate spring 31 has a shaft hole 31a through which the hinge shaft 17 is passed, a pair of projections 31b, 31c protruding from one side of the plate spring 31, and a coupling portion 31d bent from a portion of an outline of the plate spring 31 opposite to the projections 31b, 31c. The plate spring 31 is fixed onto the supporting bracket 15 and rotated together with the supporting bracket 15. The shaft hole 31a has a circular shape. The projections 31b, 31c protrude from the one side of the plate spring 31. The projections 31b, 31c are also positioned such that their respective distances from the projections 31b, 31c to the shaft hole 31a are different. A coupling portion 31d is is positioned to be fixed on a coupling hole 15c that is formed in the supporting bracket 15. Accordingly, the plate spring 31 is fixed onto the supporting bracket 15 and rotated together with the supporting bracket 15.

The frictional plate 33 is formed in tight contact with one surface of the plate spring 31. The frictional plate 33 has a coupling hole 33a corresponding to a section of the fixing portion 17b so as to be connected to, and rotated together with the fixing portion 17b of the hinge shaft 17. The frictional plate 33 also has guide holes 33b, 33c corresponding to the projections 31b, 31c of the plate spring 31. Each of the guide holes 33b, 33c receives the projections 31b, 31c to guide movement of the projections 31b, 31c. Each of the guide holes 33b, 33c are formed differently in distance with respect to the coupling hole 33a. Accordingly, when the plate spring 31 is rotated by a predetermined angle with the projections 31b, 31c being inserted in the guide holes 33b, 33c, there is no frictional force between the frictional plate 33 and the plate spring 31. However, the supporting bracket 15 is automatically rotated at a predetermined angle by the coil spring 21. When the projections 31b, 31c are guided to ends of the guide holes 33b, 33c, free rotation of the supporting bracket 15 is restricted. Then, as the supporting bracket 15 is forcedly rotated by an external force, the projections 31b, 31c are released from the guide holes 33b, 33c to a direct contact with the frictional plate 33, thereby generating a frictional force. Accordingly, the supporting bracket 15 is rotated out of an angle of free rotation by the external force. Once the supporting bracket is rotated out of the angle of the free rotation, the supporting bracket 15 is fixed in its position.

Here, the supporting bracket 15, the plate spring 31 and the frictional plate 33 are connected to come into tight contact with the supporting portion 17c of the hinge shaft 17 sequentially. Separation from the hinge shaft 17 is prevented by the fixing pin 40.

Further provided is a pivoting angle restricting device to restrict the angle of rotation of the supporting bracket 15. The pivoting angle restricting device includes a locking portion 33e protruding from an outline of the frictional plate 33, and a locking projection 15e bent from an outline of the supporting bracket 15 to be locked with the locking portion 33e during rotation. The locking portion 33e is formed in a position that restricts a pivotal angle of the supporting bracket 15 at a predetermined degree of, for example, 210°.

An operation of the hinge apparatus as configured above, will be described below.

Figure 4B:
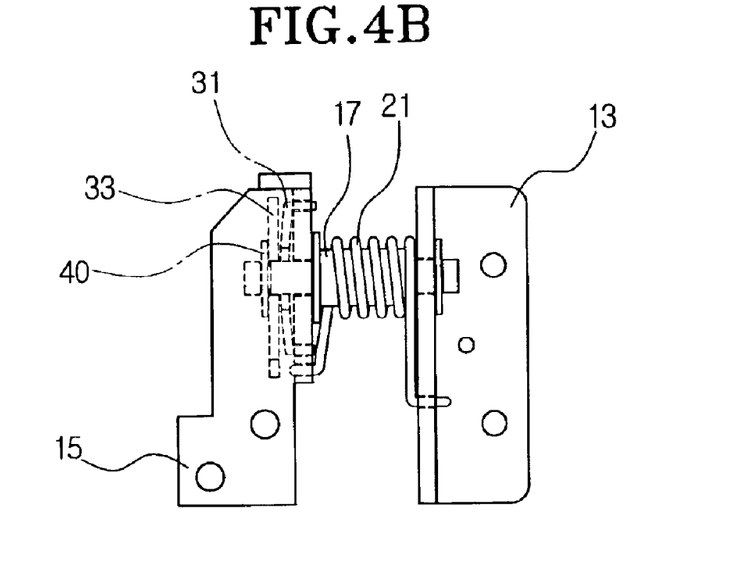

FIGS. 4A and 4B are a side view and a front view, respectively, showing a connecting state of the hinge apparatus when the panel 11 is covering the body 10. As shown in FIGS. 4A and 4B, the projections 31b, 31c of the plate spring 31 are inserted into the guide holes 33b, 33c of the frictional plate 33. The other end of the coil spring 21 is compressingly supported in one corner of the guide hole 15b. Accordingly, the supporting bracket 15 is resiliently biased in the A direction (as shown in FIG. 4A) by a compressed force, i.e., the torsion of the coil spring 21.

Figure 5:
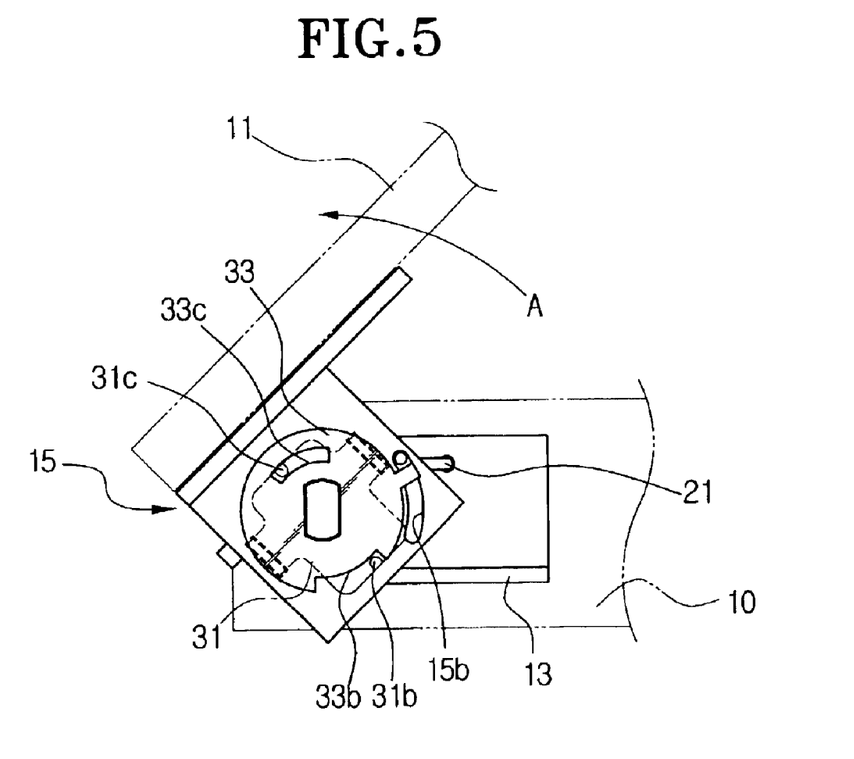
FIG. 5 is a side view showing a supporting bracket of the hinge apparatus automatically rotated by approximately 45°.

Then, as the locking device between the body 10 and the panel 11 is released, as shown in FIG. 5, the supporting bracket 15 is automatically pivoted by approximately 45°, for example, by a recovery force of the coil spring 21. Since a length of the guide holes 33b, 33c corresponds to the angle of 45°, the projections 31b, 31c are guided along the guide holes 33b, 33c by 45° without being interfered by frictional force or resistance. When the supporting bracket 15 is automatically pivoted (opened) by approximately 45° together with the panel 11, the projections 31b, 31c are moved to the ends of the guide holes 33b, 33c, respectively. Thus, the free rotation of the supporting bracket 15 is restricted. Together with the fixing bracket 13, the hinge shaft 17 and the frictional plate 33 are in fixed position with respect to the body 10. The supporting bracket 15 and the plate spring 31 are pivoted in the A direction (as shown in FIG. 4A) together with the panel 11.

Figure 6A:
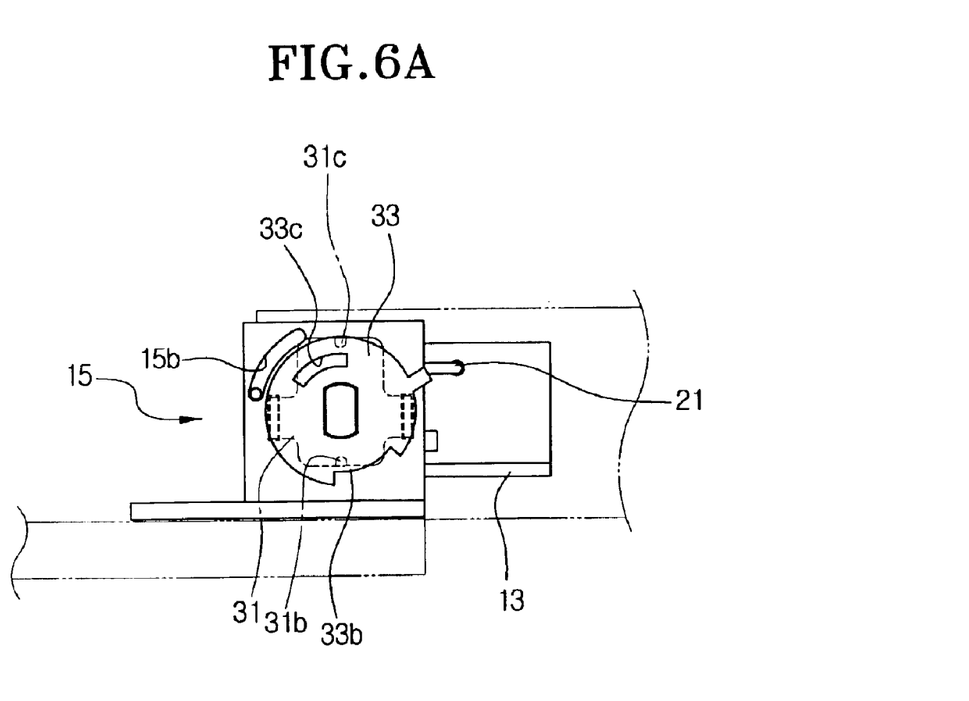
FIGS. 6A and 6B is a side view and a front view, respectively, showing the supporting bracket being rotated by approximately 180°.
Figure 6B:
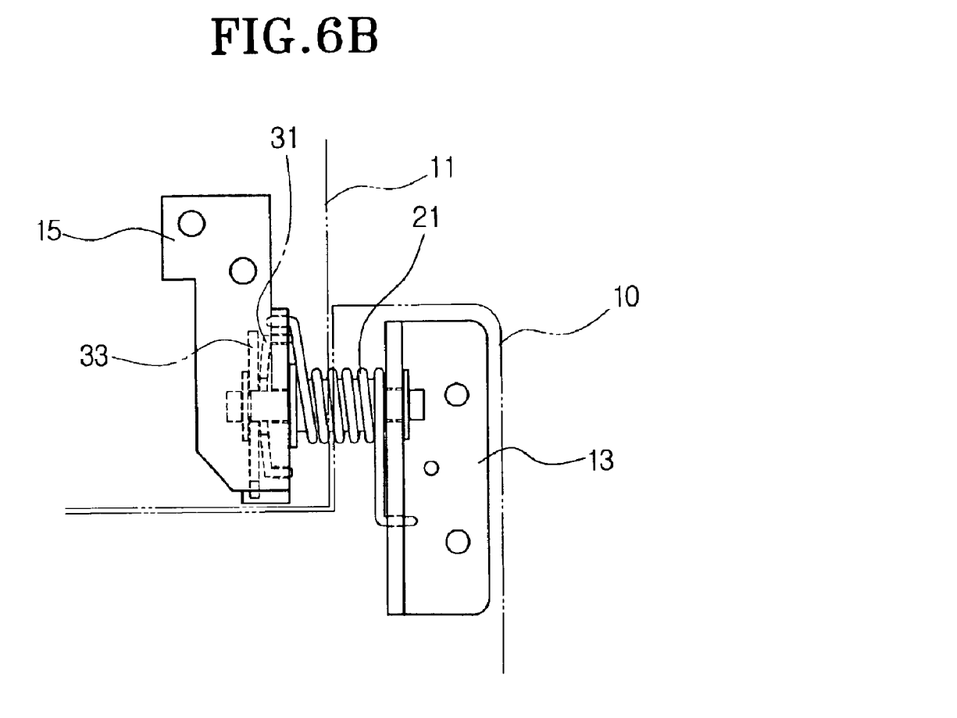

The panel 11 is moved to the state as shown in FIGS. 6A and 6B when the panel 11 is forcedly pivoted in the A direction as shown in FIG. 5 by approximately 180°. Movement by a user in addition to the free rotation angle of 45° allows for the panel 11 to be positioned in the state as shown in FIGS. 6A and 6B. Accordingly, the projections 31b, 31c of the plate spring 31 escape from the guide holes 33b, 33c and are positioned in contact with the one surface of the frictional plate 33. By the contact between the projections 31b, 31c and the frictional plate 33, the frictional force is generated between the frictional plate 33 and the plate spring 31. The frictional force has indirectly influences on the hinge shaft 17 and the supporting bracket 15. Accordingly, when the panel 11 is opened more than 45°, the opening is enabled by an external force that overcomes the frictional force. When the pivoting is stopped, the panel 11 is fixed in position by the frictional force.

Figure 7:
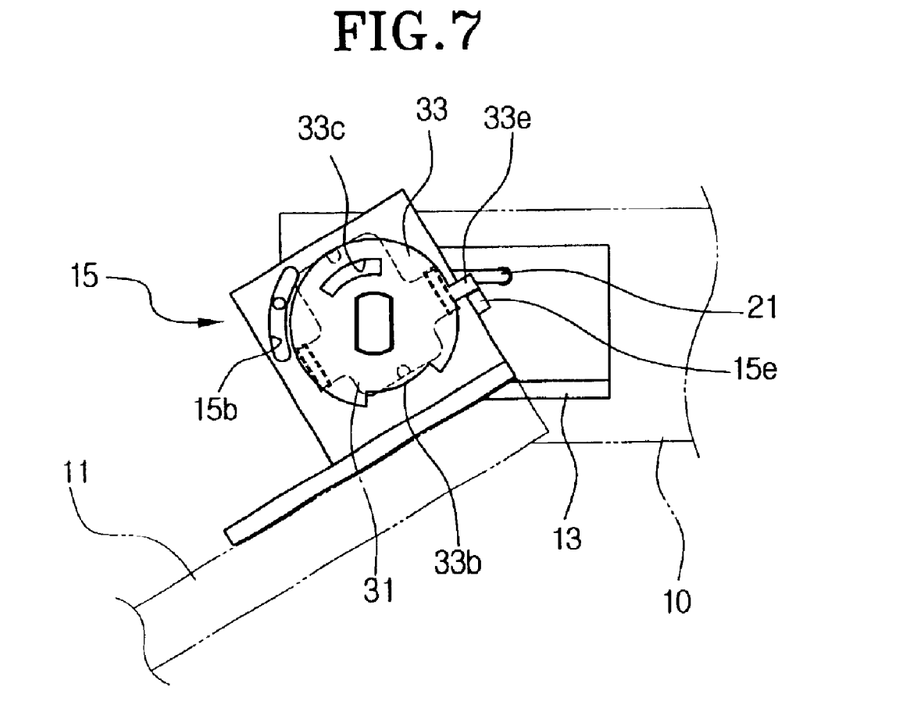
FIG. 7 is a schematic side view showing the supporting bracket being rotated by approximately 210°.

FIG. 7 shows the panel 11 being rotated by approximately 210°. Here, the locking projection 15e is locked with the locking portion 33e, thereby restricting the supporting bracket 15 from further rotation. Here also, the other end of the coil spring 21 is freely guided along the guide hole 15b, and the coil spring 21 is kept from compression.

As described above, the hinge apparatus according to the present invention provides a first operation, which is automatic, and a second operation, which is manual. By simply releasing the locking device (e.g., like pressing a button), the panel 11 is automatically opened by a predetermined angle. As a result, a body of an appliance becomes easy to use. Also, a user is allowed to adjustably open the panel 11 within an angle ranging from about 45° to 210°.

Also, as described above, the hinge apparatus according to the present invention enables pivoting movement of the supporting bracket 15 with respect to the fixing bracket 13 in a two operation manner. More specifically, since opening in the first operation is performed automatically, while the opening in the second operation is performed manually by the user, the appliance becomes easier to use.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A hinge apparatus to dispose a panel to be opened and closed with respect to a body of an appliance, comprising:
   a fixing bracket fixed on the body;
   a supporting bracket fixed on the panel;
   a hinge shaft fixed on the fixing bracket to rotatably support the supporting bracket;
   an automatic pivot unit having a guide hole, to cause the panel to be opened with respect to the body by a predetermined free rotation angle when a locking state between the panel and the body is released, the guide hole being provided in the supporting bracket;
   a manual pivot unit to provide a frictional force between the supporting bracket and the hinge shaft, the frictional force restricting the supporting bracket from being automatically rotated by the automatic pivot unit and fixing the panel, which is opened further from the predetermined free rotation angle, in position; and a fixing pin connected to one end of the hinge shaft to restrict the hinge shaft, the supporting bracket, the automatic pivot unit and the manual pivot unit from being separated from each other.

2. The hinge apparatus of claim 1, wherein the automatic pivot unit comprises:

a coil spring having one end fixed on the fixing bracket, and the other end being movably supported on the supporting bracket to provide the supporting bracket with a torsion in a direction that opens the panel with respect to the body;

wherein the guide hole is provided at a predetermined length in the supporting bracket to guide the other end of the coil spring, the guide hole restricts the other end of the coil spring from moving when the panel is in a closed state, and guides a movement of the other end of the coil spring after the panel is opened by the predetermined free rotation angle.

3. The hinge apparatus of claim 2, wherein the hinge shaft comprises:

a body of a circular section formed in a middle thereof to support the coil spring;

a fixing portion extended from both ends of the body, and having a non-circular section to correspond to a coupling hole of a non-circular section formed on the fixing bracket and the frictional plate; and a supporting portion extended between the fixing portion and the body to support one side of the supporting bracket in close contact therewith.

4. The hinge apparatus of claim 2, wherein the supporting bracket comprises a shaft passing hole through which the hinge shaft is passed, and a guide hole to which the other end of the coil spring is connected, the hinge shaft being connected to the shaft passing hole so that the supporting bracket is rotated relative to the hinge shaft.

5. The hinge apparatus of claim 4, wherein the guide hole of the supporting bracket has a length to correspond to an automatically opened angle of the panel.

6. The hinge apparatus of claim 5, wherein the panel is opened by an external force beyond an opening of the automatically opened angle.

7. The hinge apparatus of claim 2, wherein the torsion of the coil spring is set at a level in which the panel is automatically opened with respect to the body by an angle of 45°.

8. The hinge apparatus of claim 2, wherein the predetermined free rotation angle is 45°.

9. The hinge apparatus of claim 1, wherein the manual pivot unit comprises:

a plate spring fixed on and pivoted together with the supporting bracket, and having a projection protruding from one side thereof; and a frictional plate fixed on the hinge shaft in tight contact with the plate spring, the frictional plate formed with a guide hole of a predetermined length corresponding to the predetermined free rotation angle of the panel to guide a movement of the projection, wherein the projection is guided along the guide hole of the friction plate when the panel is automatically rotated, and escapes from the guide hole to contact with one side of the frictional plate to generate a frictional force when the panel is moved out of the predetermined free rotation angle.

10. The hinge apparatus of claim 9, wherein the projection is provided in pairs that are formed at a different distance from a center of rotation of the plate spring, and the guide hole of the friction plate is provided in pairs that are formed with respect to a center of the frictional plate asymmetrically to correspond to the pair of projections.

11. The hinge apparatus of claim 9, further comprising:

a pivot angle restricting device to restrict an angle of a manual rotation of the supporting bracket.

12. The hinge apparatus of claim 11, wherein the pivot angle restricting device further comprises:

a locking portion protruding from an outline of the frictional plate; and a locking projection bent from one end of the supporting bracket to be locked with the locking portion during the rotation of the supporting bracket.

13. The hinge apparatus of claim 5, wherein the angle of which the manual rotation of the supporting bracket is restricted is 210°.

14. A hinge apparatus to dispose a panel to be opened and closed with respect to a body of an appliance, comprising:

an automatic pivot unit having a guide hole, to cause the panel to be opened with respect to the body by a predetermined free rotation angle when a locking state between the panel and the body is released;

a manual pivot unit to provide a frictional force between a supporting bracket fixed on the panel and a hinge shaft fixed on a fixing bracket on the body, the frictional force restricting the supporting bracket from being automatically rotated by the automatic pivot unit and fixing the panel, which is opened further from the predetermined free rotation angle, in a fixed position, the guide hole being provided in the supporting bracket; and a fixing pin connected to one end of the hinge shaft to restrict the hinge shaft, the automatic pivot unit and the manual pivot unit from being separated from each other.

15. The hinge apparatus of claim 14, wherein an opening of the panel ranges from 45° to 210°.

* * * * *